United States Patent [19]

Kohno et al.

[11] Patent Number: 4,588,564
[45] Date of Patent: May 13, 1986

[54] PROCESS FOR RECOVERING ARSENIC TRIOXIDE FROM EXHAUST GAS OF SMELTING

[75] Inventors: Hiroshi Kohno; Haruhiko Asao; Masao Kuwabara; Takashi Shimizu, all of Fukushima, Japan

[73] Assignee: Onahama Smelting and Refining Company, Ltd., Tokyo, Japan

[21] Appl. No.: 660,110

[22] Filed: Oct. 12, 1984

[30] Foreign Application Priority Data

Mar. 16, 1984 [JP] Japan .................. 58-049291

[51] Int. Cl.[4] .............................. C01B 27/00
[52] U.S. Cl. .......................... 423/87; 423/617
[58] Field of Search ................. 423/87, 617

[56] References Cited

U.S. PATENT DOCUMENTS

| 1,921,706 | 8/1933 | Schopper | 423/87 |
| 2,959,467 | 11/1960 | Yusuf et al. | 423/87 |
| 3,107,977 | 10/1963 | Boruali et al. | 423/87 |
| 4,401,632 | 8/1983 | Madsen et al. | 423/87 |

FOREIGN PATENT DOCUMENTS 458558  8/1949  Canada .................. 423/87

Primary Examiner—John Doll
Assistant Examiner—Wayne A. Langel
Attorney, Agent, or Firm—Webb, Burden, Robinson & Webb

[57] ABSTRACT

In the process for recovering arsenic trioxide from scrubbing water used to scrub the flue gas of sulfide ore smelting, the crude arsenic trioxide crystals collected from the scrubbing solution which contains plaster as an impurity is purified by treating it with hydrochloric acid of a concentration of 50–150 g/l at a temperature not higher than 30° C.

6 Claims, 2 Drawing Figures

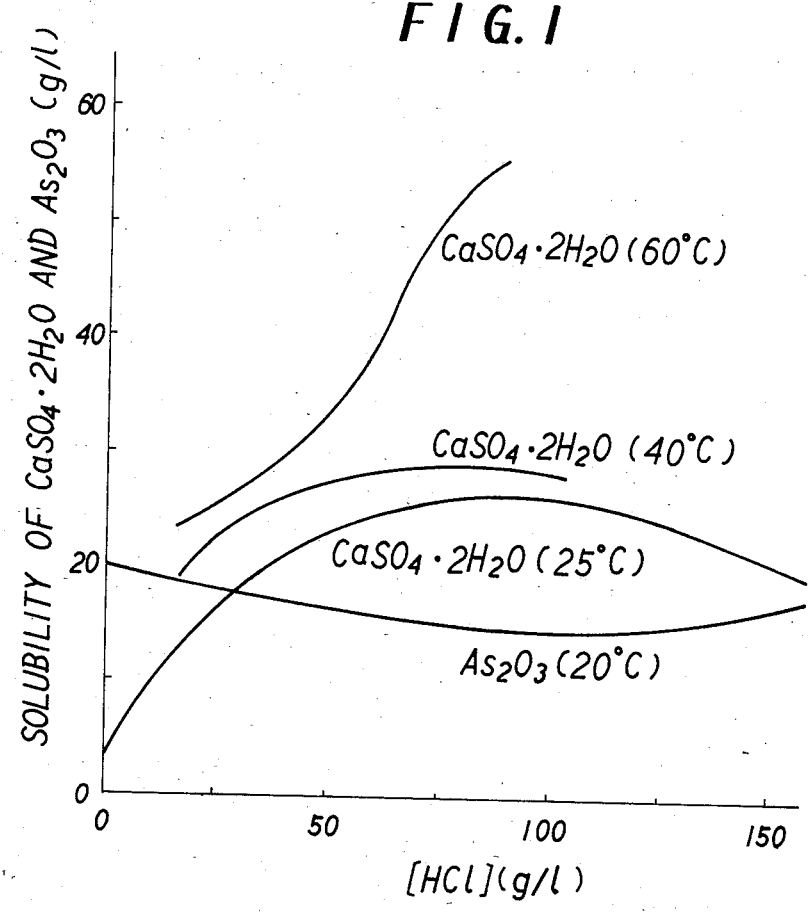

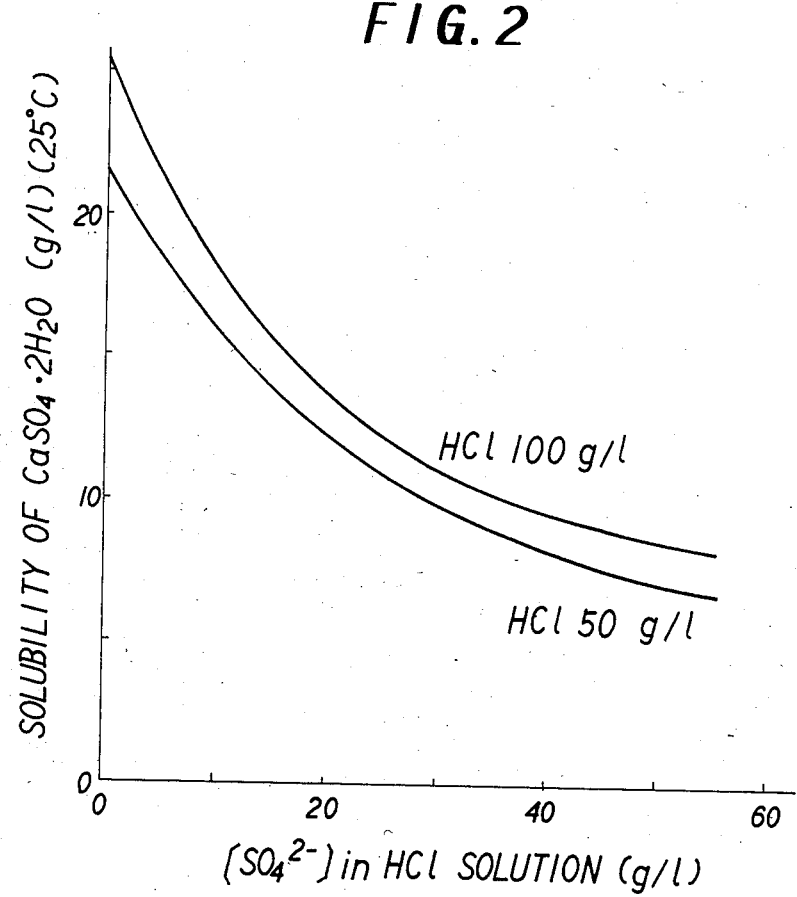

PROCESS FOR RECOVERING ARSENIC TRIOXIDE FROM EXHAUST GAS OF SMELTING

A process for recovering arsenic trioxide from exhaust gas of smelting

TECHNICAL FIELD OF THE INVENTION

This invention relates to an improved process for recovering arsenic trioxide (diaresenic trioxide $As_2O_3$) from the exhaust gas of smelting. According to this invention, arsenic trioxide of a purity of 99% or more can be recovered.

BACKGROUND OF THE INVENTION

Arsenic trioxide has conventionally been produced by oxidation roasting of arsenopyrite or arsenic sulfide. But recently, it has been produced by purifying the recovery from the exhaust gas (flue gas) from the non-ferrous smelting which treats sulfide ores of copper, lead, zinc, etc.

The exhaust gas, that is, flue gas is subjected to dust collection treatment, and the uncollected residual arsenic values are collected in scrubbing water and passed to the waste water treatment plant.

The arsenic values in the scrubbing water is precipitated as arsenic sulfide by the addition of hydrogen sulfide, sodium hydrosulfide, or the like, the precipitate is separated, roasted, sublimed and condensed, and the arsenic is recovered as arsenic trioxide. However, this process requires large-scale equipment, and the operation thereof consumes a large amount of energy. Also, dust prevention measures are required because this is a dry process.

Acid leaching of the above-described arsenic sulfide is also practiced for the recovery of arsenic trioxide. This process is complicated, and therefore is not suitable as a commercial operation. Extraction processes in which an organic solvent, such as TBP, is used has been proposed, but they have not yet been industrially applied.

A process for recovering arsenic trioxide from the scrubbing water for the flue gas by crystallizing arsenic trioxide therein has been proposed (Laid-Open Patent Publication No. 118028/82). This process comprises removing fluorine compounds by adding a neutralizing agent to the scrubbing water for the flue gas, if necessary, and recovering arsenic trioxide crystals by vacuum evaporation or cooling. The defect of this process is that an unnegligible amount of plaster (calcium sulfate) is contained in the crystals, and it is difficult to consistently obtain arsenic trioxide of the commercially required purity of 99%.

We reexamined every step of the above-described prior art processes, and have completed a process for recovering arsenic trioxide having a purity of at least 99% with low plaster content by a simple unit operation with small consumption of energy.

DISCLOSURE OF THE INVENTION

According to this invention, there is provided a process for recovering arsenic trioxide from exhaust gas of sulfide ore smelting, comprising subjecting the exhaust gas to dust collecting treatment at a temperature of not lower than 250° C., scrubbing the gas with water, whereby the amount of water is adjusted so that the arsenic concentration in the scrubbing solution is at least 80% of the saturation concentration at a temperature not lower than the dew point of water in the exhaust gas, thus separating out solid particles suspended in the solution, crystallizing arsenic trioxide from the solution by vacuum evaporation or cooling at a pH not higher than 2, treating the crystals separated from the mother liquid with a hydrochloric acid solution of a concentration of 50-150 g/l and of a temperature not higher than 30° C., and collecting the crystals that remain.

The dust collection treatment is preferably carried out at a temperature not lower than 300° C. The hydrochloric acid treatment is carried out preferably with hydrochloric acid of a concentration of 75-125 g/l, and more preferably of a concentration of about 100 g/l.

In the above process, if necessary, fluorine in the scrubbing solution can be removed by treating with calcium hydroxide or carbonate after separating out suspended solid particles are described below in detail.

The process of this invention can be applied to all flue gases from the smelting of sulfide ores containing arsenic as an impurity. The sulfur dioxide gas concentration of the exhaust gas does not influence this process. The process can be carried out without trouble even if the flue gas to be treated contains small amounts of copper, zinc, lead, mercury, antimony and selenium.

The dust collection treatment of the exhaust gas is carried out at a temperature not lower than 250° C., and preferably not lower than 300° C. in order to prevent loss of arsenic values in the flue dust.

The flue gas from which the dust has been collected is contacted with water in a scrubbing tower, for instance, wherein scrubbing water is circulated and fresh water is supplied, the amount of the water supplied being regulated so that the arsenic trioxide concentration is at least 80% of the saturation concentration at the treating temperature. The gas scrubbing is carried out at a temperature not lower than the dew point of water in the gas, and the preferable temperature in practical operations is about 60° C. At this temperature, the saturation concentration of arsenic trioxide is about 33 g/l, and therefore, the arsenic trioxide concentration should be 25 g/l or more.

This resultant scrubbing solution contains solid particles of lead, mercury and selenium compounds, which must be separated out. Some exhaust gases contain a higher concentration of fluorine. If fluorine contained in the recovered arsenic trioxide crystals is a problem, the fluorine should be removed as calcium fluoride by adding calcium hydroxide, carbonate, etc. at this stage. In this case, it is undesirable to basify the solution too much so as to form calcium sulfate precipitate. It is sufficient, if the pH is raised to 3-4. After the solid particles are separated out, the mother liquid is acidified to a pH of 2 or lower by the addition of sulfuric acid, and thereafter the arsenic trioxide therein is crystallized by vacuum evaporation or cooling. Impurities such as copper, zinc, etc. remain in the sulfuric acid acidic solution. The deposited crystals are separated by filtration or decantation. In this case, a part of the mother liquid can be recirculated to the scrubbing tower in order to raise the rate of arsenic trioxide recovery.

The arsenic trioxide crystals are collected, and are treated with a hydrochloric acid solution of a concentration of 50-150 g/l at a temperature not higher than 30° C. so as to dissolve any plaster. Thus arsenic trioxide of not less than 99% purity is recovered.

BRIEF DESCRIPTION OF THE DRAWINGS

Now the invention is explained in detail with reference to the attached drawing.

FIG. 1 is a diagram showing the solubility of arsenic trioxide and of plaster in hydrochloric acid of various concentrations at various temperatures.

FIG. 2 is a diagram which shows the influence of sulfuric acid on the solubility of plaster in hydrochloric acid.

DETAILED DESCRIPTION OF THE INVENTION

We confirmed that the impurity of a little more than about 1% included in the arsenic trioxide crystallized from the mother liquid is largely plaster, and we therefore directed our efforts toward finding a process for removing the plaster. We sought a process for selectively dissolving plaster from the arsenic trioxide crystals using a inexpensive reagent, and a simple operation with low energy consumption.

Plaster is easily dissolved by ammonium acetate, nitric acid or hydrochloric acid solution. Of these, ammonium acetate is expensive, and nitric acid is troublesome to dispose of after use, and we therefore selected hydrochloric acid from considerations of cost and ease of disposal of waste liquid.

The solubility of arsenic trioxide in a hydrochloric acid solution largely depends on the acid concentration, and is lowest at 100–150 g/l HCl at around room temperature, which is lower than in water. (Mukikagaku Zensho IV-3, published by Maruzen K.K.)

FIG. 1 shows the solubility of arsenic trioxide and plaster in hydrochloric acid at various temperatures and various concentrations, which we found from our experiments. From FIG. 1 it can be seen that, it is advantageous to separate arsenic trioxide and plaster using a hydrochloric acid solution of a concentration of around 100 g/l at room temperature.

FIG. 2 shows changes in the solubility of plaster in hydrochloric acid solution with respect to the sulfuric acid concentration. From this figure, it can be seen that the solubility of plaster drops sharply when sulfate ions are contained in the hydrochloric acid. It is learned that hydrochloric acid treatment of crystallized arsenic trioxide is preferably carried out after the mother liquid containing sulfuric acid ions is separated.

This invention is based on the results of these experiments.

Now the invention will be illustrated by way of working examples.

A flue gas released from a copper-smelting reverberatory furnace and treated with a Cotrell dust collector at not lower than 300° C. was scrubbed with water at the rate of 240,000 Nm$^3$/hr, whereby scrubbing water is recirculated with fresh supply of water at the rate of 4 tons/hr. Precise analysis of this scrubbing solution revealed that it contained:

| | |
|---|---|
| Sulfate ions | 41.1 g/l |
| Arsenic | 31.1 g/l |
| Calcium | 1.3 g/l |
| Zinc | 7.4 g/l |
| Copper | 2.0 g/l |
| Antimony | 0.2 g/l |
| Fluorine | 6.5 g/l |
| Suspended solid matter | 10.0 g/l |

The suspended solid matter was separated and the mother liquid was cooled. The deposited crystals were collected and analyzed. They contained:

| | |
|---|---|
| Arsenic trioxide | 97.46 wt % |
| Calcium oxide | 0.49 wt % |
| Sulfur | 0.39 wt % |
| Antimony | 0.20 wt % |
| Lead | 0.22 wt % |
| Fluorine | 0.004 wt % |

Three hundred (300) grams of these crystals were put into 1 liter of a hydrochloric acid solution of a concentration of 100 g/l and the solution was stirred for 1 hour. Thereafter the crystals were collected by filtration and washed and 280 g of purified arsenic trioxide crystals was obtained. The arsenic trioxide crystals were analyzed and found to contain the following:

| | |
|---|---|
| Arsenic trioxide | 99.46 wt % |
| Calcium oxide | 0.004 wt % |
| Sulfur | 0.004 wt % |
| Antimony | 0.21 wt % |
| Lead | 0.03 wt % |

Another scrubbing solution contained:

| | |
|---|---|
| Sulfate ions | 76.5 g/l |
| Arsenic | 26.9 g/l |
| Calcium | 1.4 g/l |
| Zinc | 12.6 g/l |
| Copper | 3.2 g/l |
| Antimony | 0.31 g/l |
| Fluorine | 15 g/l |
| Suspended solid matter | 1 g/l |

To this scrubbing solution, calcium carbonate was added so as to raise the pH to about 3.5, and the formed solid matter was separated. The solution was cooled and the crude arsenic oxide was collected. The analysis showed:

| | |
|---|---|
| Arsenic trioxide | 89.47 wt % |
| Calcium oxide | 2.98 wt % |
| Sulfur | 1.89 wt % |
| Antimony | 0.29 wt % |
| Lead | 0.11 wt % |
| Fluorine | 0.001 wt % |

Three hundred (300) grams of the crystals were put into 1 liter of a hydrochloric acid solution of a concentration of 100 g/l and the solution was stirred for 1 hour. The crystals were collected by filtration and washed and 255 g of purified arsenic trioxide was thus obtained. This arsenic trioxide was analyzed and found to contain the following:

| | |
|---|---|
| Arsenic trioxide | 99.36 wt % |
| Calcium oxide | 0.03 wt % |
| Sulfur | 0.01 wt % |
| Antimony | 0.36 wt % |
| Lead | 0.005 wt % |

As has been described above, the process of this invention enables production of arsenic trioxide of a higher purity more economically than with the prior art processes.

We claim:

1. A process for recovering arsenic trioxide from exhaust gas of sulfide ore smelting, comprising subjecting the exhaust gas to dust collecting treatment at a temperature of not lower than 250° C., scrubbing the gas with water, whereby the amount of water is adjusted so that the arsenic concentration in the scrubbing solution is at least 80% of the saturation concentration at a temperature not lower than the dew point of water in the exhaust gas, thus separating out solid particles suspended in the solution, crystallizing arsenic trioxide from the solution by vacuum evaporation or cooling at a pH not higher than 2, treating the crystals separated from the mother liquid with a hydrochloric acid solution of a concentration of 50–150 g/l and of a temperature not higher than 30° C., and collecting the crystals that remain.

2. The process as claimed in claim 1, wherein the dust collection is effected at a temperature not lower than 300° C., and the arsenic trioxide crystals are treated with a hydrochloric acid solutin of a concentration of 75–125 g/l at room temperature.

3. The process as claimed in claim 2, wherein the concentration of the hydrochloric acid solution is about 100 g/l.

4. A process for recovering arsenic trioxide from exhaust gas of sulfide ore smelting, comprising subjecting the exhaust gas to dust collecting treatment at a temperature of not lower than 250° C., scrubbing the gas with water, whereby the amount of water is adjusted so that the arsenic concentration in the scrubbing solution is at least 80% of the saturation concentration at a temperature not lower than the dew point of water in the exhaust gas, thus separating solid particles suspended in the solution, raising the pH of the solution to any desired value not higher than 4 by the addition of calcium hydroxide or carbonate, separating formed solid particles, adding sulfuric acid so as to lower the pH to 2 or less, crystallizing arsenic trioxide from the solution by vacuum evaporation or cooling, treating the crystals separated from the mother liquid with a hydrochloric acid solution of a concentration of 50–150 g/l and of a temperature not higher than 30° C., and collecting the remaining crystals.

5. The process as claimed in claim 4, wherein the dust collection is effected at a temperature not lower than 300° C., and the arsenic trioxide crystals are treated with hydrochloric acid solution of the concentration of 75–125 g/l at room temperature.

6. The process as claimed in claim 5, wherein the concentration of the hydrochloric acid solution is about 100 g/l.

* * * * *